United States Patent
Lunde et al.

(10) Patent No.: US 8,751,815 B2
(45) Date of Patent: Jun. 10, 2014

(54) CREATING AND VERIFYING GLOBALLY UNIQUE DEVICE-SPECIFIC IDENTIFIERS

(75) Inventors: Ron Lunde, Portland, OR (US); Daniel Lulich, Portland, OR (US); Greg Pierson, Woodland, WA (US)

(73) Assignee: iovation Inc., Portland, OR (US)

( * ) Notice: Subject to any disclaimer, the term of this patent is extended or adjusted under 35 U.S.C. 154(b) by 893 days.

(21) Appl. No.: 11/923,572

(22) Filed: Oct. 24, 2007

(65) Prior Publication Data

US 2008/0104684 A1    May 1, 2008

Related U.S. Application Data

(60) Provisional application No. 60/862,965, filed on Oct. 25, 2006.

(51) Int. Cl.
*G06F 21/00* (2013.01)
*H04L 29/06* (2006.01)
*H04L 9/32* (2006.01)

(52) U.S. Cl.
USPC ............................. 713/185; 713/159; 713/172

(58) Field of Classification Search
USPC .............. 726/2–5, 27–30; 713/166, 168, 178, 713/182, 185, 172, 159; 705/3, 26, 36, 42, 705/64–67, 71–76
See application file for complete search history.

(56) References Cited

U.S. PATENT DOCUMENTS

| | | | |
|---|---|---|---|
| 5,337,357 A | 8/1994 | Chou et al. | |
| 5,696,824 A | 12/1997 | Walsh | |
| 5,819,226 A | 10/1998 | Gopinathan et al. | |
| 5,838,306 A | 11/1998 | O'Connor et al. | |
| 5,903,478 A | 5/1999 | Fintel et al. | |
| 6,026,166 A | 2/2000 | LeBourgeois | |
| 6,108,790 A | 8/2000 | Moriya et al. | |

(Continued)

FOREIGN PATENT DOCUMENTS

| CA | 2570045 | 12/2005 |
|---|---|---|
| CA | 2667279 | 10/2008 |

(Continued)

OTHER PUBLICATIONS

Canadian Patent Application No. 2667233, Official Action issued by CIPO dated Mar. 25, 2011, 2 pages.

(Continued)

*Primary Examiner* — Teshome Hailu
(74) *Attorney, Agent, or Firm* — Davis Wright Tremaine LLP; Heather M. Colburn

(57) ABSTRACT

Methods, apparatuses, and articles for receiving, by a server, a plurality of identifiers associated with a client device are described herein. The server may also encrypt a plurality of encoding values associated with the plurality of identifiers using a first key of a key pair of the server, and generate a token uniquely identifying the client device, a body of the token including the encrypted plurality of encoding values. In other embodiments, the server may receive a token along with the plurality of identifiers. In such embodiments, the server may further verify the validity of the received token, including attempting to decrypt a body of the received token with a key associated with a second server, the second server having generated the received token, and, if decryption succeeds, comparing ones of the plurality of identifiers with second identifiers found in the decrypted body to check for inconsistencies.

21 Claims, 4 Drawing Sheets

(56) References Cited

U.S. PATENT DOCUMENTS

| | | | |
|---|---|---|---|
| 6,148,407 A | 11/2000 | Aucsmith | |
| 6,222,547 B1 | 4/2001 | Fintel et al. | |
| 6,243,468 B1 | 6/2001 | Pearce et al. | |
| 6,263,376 B1 | 7/2001 | Hatch et al. | |
| 6,324,267 B1 | 11/2001 | Hraster et al. | |
| 6,418,472 B1 | 7/2002 | Mi et al. | |
| 6,425,085 B2 | 7/2002 | Hashikura | |
| 6,442,696 B1 | 8/2002 | Wray et al. | |
| 6,449,645 B1 | 9/2002 | Nash | |
| 6,460,140 B1 | 10/2002 | Schoch et al. | |
| 6,569,205 B1 | 5/2003 | Poggi | |
| 6,571,339 B1 | 5/2003 | Danneels et al. | |
| 6,856,963 B1 | 2/2005 | Hurwitz | |
| 6,868,525 B1 | 3/2005 | Szabo | |
| 6,914,968 B1 | 7/2005 | Ryley et al. | |
| 6,928,558 B1 | 8/2005 | Allahwerdi et al. | |
| 7,024,177 B2 | 4/2006 | Bhasin et al. | |
| 7,047,414 B2 | 5/2006 | Wheeler et al. | |
| 7,210,169 B2 | 4/2007 | Smith et al. | |
| 7,231,657 B2 | 6/2007 | Honarvar et al. | |
| 7,263,506 B2 | 8/2007 | Lee et al. | |
| 7,272,728 B2 | 9/2007 | Pierson et al. | |
| 7,310,780 B2 | 12/2007 | Diering et al. | |
| 7,373,515 B2 | 5/2008 | Owen et al. | |
| 7,403,922 B1 | 7/2008 | Lewis et al. | |
| 7,529,731 B2 | 5/2009 | Bier | |
| 7,562,058 B2 | 7/2009 | Pinto et al. | |
| 7,610,617 B2* | 10/2009 | Kelly et al. | 726/5 |
| 7,685,206 B1* | 3/2010 | Mathew et al. | 707/785 |
| 7,882,121 B2 | 2/2011 | Bruno | |
| 7,908,645 B2 | 3/2011 | Varghese et al. | |
| 2001/0044896 A1 | 11/2001 | Schwartz et al. | |
| 2002/0035622 A1 | 3/2002 | Barber | |
| 2002/0059130 A1 | 5/2002 | Cheng | |
| 2002/0073046 A1 | 6/2002 | David | |
| 2002/0111996 A1 | 8/2002 | Jones et al. | |
| 2002/0111998 A1 | 8/2002 | Kim | |
| 2002/0120726 A1 | 8/2002 | Padole et al. | |
| 2002/0147000 A1 | 10/2002 | Holmes-Kinsella | |
| 2002/0162029 A1 | 10/2002 | Allen et al. | |
| 2002/0188556 A1 | 12/2002 | Colica et al. | |
| 2003/0005287 A1 | 1/2003 | Wray et al. | |
| 2003/0028762 A1 | 2/2003 | Trilli et al. | |
| 2003/0163708 A1 | 8/2003 | Tang | |
| 2003/0182421 A1 | 9/2003 | Faybishenko et al. | |
| 2004/0049587 A1 | 3/2004 | Henaff et al. | |
| 2004/0148525 A1 | 7/2004 | Aida et al. | |
| 2004/0158574 A1 | 8/2004 | Tom et al. | |
| 2004/0172561 A1 | 9/2004 | Iga | |
| 2004/0215788 A1 | 10/2004 | Morris | |
| 2004/0230831 A1 | 11/2004 | Spelman et al. | |
| 2004/0236702 A1 | 11/2004 | Fink et al. | |
| 2004/0242200 A1 | 12/2004 | Maeoka et al. | |
| 2004/0243802 A1 | 12/2004 | Jorba | |
| 2005/0022020 A1* | 1/2005 | Fremberg | 713/201 |
| 2005/0033833 A1 | 2/2005 | Baldiga et al. | |
| 2005/0044385 A1* | 2/2005 | Holdsworth | 713/185 |
| 2005/0075992 A1 | 4/2005 | Gavan et al. | |
| 2005/0114530 A1* | 5/2005 | Mangalik et al. | 709/229 |
| 2005/0138362 A1 | 6/2005 | Kelly et al. | |
| 2005/0166053 A1 | 7/2005 | Cui et al. | |
| 2005/0182660 A1 | 8/2005 | Henley | |
| 2005/0268107 A1* | 12/2005 | Harris et al. | 713/182 |
| 2005/0273442 A1 | 12/2005 | Bennett et al. | |
| 2006/0004558 A1 | 1/2006 | Bankes | |
| 2006/0010072 A1 | 1/2006 | Eisen | |
| 2006/0026692 A1 | 2/2006 | Lakhani | |
| 2006/0069697 A1 | 3/2006 | Shraim et al. | |
| 2006/0553095 | 3/2006 | Koch et al. | |
| 2006/0080536 A1 | 4/2006 | Teppler | |
| 2006/0129835 A1 | 6/2006 | Ellmore | |
| 2006/0200855 A1* | 9/2006 | Willis | 726/2 |
| 2006/0235796 A1* | 10/2006 | Johnson et al. | 705/44 |
| 2007/0011724 A1 | 1/2007 | Gonzalez et al. | |
| 2007/0073630 A1 | 3/2007 | Greene et al. | |
| 2007/0113090 A1 | 5/2007 | Villela | |
| 2008/0020738 A1 | 1/2008 | Ho et al. | |
| 2008/0052091 A1 | 2/2008 | Vawter | |
| 2008/0059380 A1 | 3/2008 | Bleahen | |
| 2008/0063161 A1 | 3/2008 | Joyce et al. | |
| 2008/0065892 A1* | 3/2008 | Bailey et al. | 713/171 |
| 2008/0083017 A1 | 4/2008 | Lulich et al. | |
| 2008/0104070 A1 | 5/2008 | Lonchar et al. | |
| 2008/0104672 A1 | 5/2008 | Lunde et al. | |
| 2008/0167888 A1 | 7/2008 | Keithley | |
| 2008/0167966 A1 | 7/2008 | Ramsdale et al. | |
| 2008/0174603 A1 | 7/2008 | Brass et al. | |
| 2008/0281733 A1 | 11/2008 | Kubo et al. | |
| 2008/0288405 A1 | 11/2008 | John | |
| 2008/0318548 A1 | 12/2008 | Bravo et al. | |
| 2009/0006861 A1 | 1/2009 | Bemmel | |
| 2009/0013399 A1 | 1/2009 | Cottrell et al. | |
| 2009/0031131 A1* | 1/2009 | Qiu et al. | 713/172 |
| 2009/0089869 A1 | 4/2009 | Varghese | |
| 2009/0119194 A1 | 5/2009 | Chau et al. | |
| 2009/0134215 A1 | 5/2009 | Drummond et al. | |
| 2009/0259588 A1 | 10/2009 | Lindsay | |
| 2009/0265198 A1 | 10/2009 | Lester et al. | |
| 2009/0271306 A1 | 10/2009 | Pierson | |
| 2010/0269168 A1 | 10/2010 | Hegli et al. | |
| 2011/0022483 A1 | 1/2011 | Hammad | |
| 2011/0295722 A1 | 12/2011 | Reisman | |
| 2012/0030083 A1 | 2/2012 | Newman et al. | |

FOREIGN PATENT DOCUMENTS

| | | |
|---|---|---|
| CN | 1353383 | 6/2002 |
| CN | 1469583 | 1/2004 |
| GB | 2420192 | 5/2006 |
| JP | 2007-052688 | 3/2007 |
| JP | 2007-087079 | 4/2007 |
| KR | 10-2006-0060521 | 6/2006 |
| WO | 99/66378 | 12/1999 |
| WO | 2005125073 | 12/2005 |
| WO | 2008042871 | 4/2008 |
| WO | 2008052128 | 5/2008 |
| WO | 2008052132 | 5/2008 |
| WO | 2008082672 | 7/2008 |
| WO | 2008130440 | 10/2008 |
| WO | 2009134941 | 11/2009 |

OTHER PUBLICATIONS

Canadian Patent Application No. 2667279, Official Action issued by CIPO dated Apr. 11, 2012, 3 pages.
Canadian Patent Application No. 2570045, Examiner's Report issued by CIPO dated Jan. 11, 2013, 2 pages.
Conti, et al., "Visual Exploration of Malcious Network Objects Using Semantic Zoom, Interactive Encoding and Dynamic Queries," IEEE, Workshop on Visualization for Computer Security, Oct. 26, 2005, pp. 83-90.
Chinese Patent Application No. 200580022148.4: Official Action issued from State Intellectual Property Office of The People's Republic of China on Oct. 9, 2010 with English translation attached thereto, 15 pages.
Chinese Patent Application No. 200580022148.4: Official Action issued from State Intellectual Property Office of The People's Republic of China on Mar. 8, 2010 with English translation attached thereto, 12 pages.
Chinese Patent Application No. 200580022148.4: Official Action issued from State Intellectual Property Office of The People's Republic of China on Jul. 3, 2009 with English translation attached thereto, 15 pages.
Chinese Patent Application No. 200580022148.4: Official Action issued from State Intellectual Property Office of The People's Republic of China on Sep. 5, 2008 with English translation attached thereto, 10 pages.
Chinese Patent Application No. 200580022148.4: Official Action issued from State Intellectual Property Office of The People's Republic of China on Aug. 12, 2011, 7 pages.
Chinese Office Action for Application Serial No. 2011080900572420 dated Aug. 12, 2011, 4 pages.

(56) References Cited

OTHER PUBLICATIONS

English Translation of CN 1353383 as provided to Davis Wright Tremaine by Chinese Agent, 18 pages, 2002.
English Translation of CN 1469583 as provided to Davis Wright Tremaine by Chinese Agent, 20 pages, 2004.
English Abstract of JP 2007-087079, obtained from espace.net on Jan. 6, 2011, 1 page.
English Abstract of JP 2007-052688, obtained from espace.net on Jan. 6, 2011, 1 page.
Eick, et al., "Visualizing Corporate Data," Jan. 1996, AT&T Technical Journal, pp. 1-25.
Eick, et al., "Visualizing Corporate Data," 1997, IEEE, pp. 6-11.
European Patent Convention Application No. 07844618.4: European Search Report issued from the European Patent Office on Apr. 9, 2010, 5 pages.
European Patent Convention Application No. 07844618.4: European Search Report issued from the European Patent Office on Mar. 30, 2010, 2 pages.
European Patent Convention Application No. 05758533.3: Official Action issued from the European Patent Office on Jun. 4, 2009, 10 pages.
European Patent Convention Application No. 05758533.3: European Search Report issued from the European Patent Office on Apr. 21, 2009, 2 pages.
International Patent Application No. PCT/US2007/082557: Written Opinion and International Preliminary Report on Patentability of the International Searching Authority dated Jun. 13, 2008, 4 pages.
International Patent Application No. PCT/US2007/082557: International Search Report dated Jun. 13, 2008, 2 pages.
International Patent Application No. PCT/US2005/021034: Written Opinion and International Preliminary Report on Patentability of the International Searching Authority dated Jun. 11, 2007, 4 pages.
International Patent Application No. PCT/US2005/021034: International Search Report dated Jun. 11, 2007, 2 pages.
International Patent Application No. PCT/US2005/026525: International Search Report dated Nov. 30, 2009, 3 pages.
International Patent Application No. PCT/US2005/026525: Written Opinion and International Preliminary Report on Patentability of the International Searching Authority dated Nov. 30, 2009, 5 pages.
International Patent Application No. PCT/US2007/080117: International Search Report dated Jul. 16, 2008, 3 pages.
International Patent Application No. PCT/US2007/080117: Written Opinion and Preliminary Report on Patentability of the International Searching Authority dated Jul. 16, 2008, 6 pages.
International Patent Application No. PCT/US2007/082553: International Search Report dated Jun. 24, 2008, 2 pages.
International Patent Application No. PCT/US2007/082553: Written Opinion and Preliminary Report on Patentability of the International Searching Authority dated Jun. 24, 2008, 4 pages.
International Patent Application No. PCT/US2007/082559: International Search Report dated Mar. 25, 2009, 3 pages.
International Patent Application No. PCT/US2007/082559: Written Opinion and International Preliminary Report on Patentability of the International Searching Authority dated Mar. 25, 2009, 4 pages.
International Patent Application No. PCT/US2009/042184: International Search Report dated Nov. 18, 2009, 3 pages.
International Patent Application No. PCT/US2009/042184:Written Opinion of International Search Authority dated Nov. 18, 2009, 3 pages.
International Patent Application No. PCT/US2009/042184: International Preliminary Report on Patentability dated Nov. 2, 2010, 3 pages.
List of Pending Claims for Chinese Patent Application No. 200580022148.4, filed Jun. 14, 2005, 7 pages.
Listing of Pending Claims for Japanese Application No. 2007/516658, which is the National phase of International Application No. PCT/US2005/021034, filed Jun. 14, 2005, 7 pages.
Livnat, et al., "A Visualization paradigm for Network Intrusion Detection," Jun. 2005, IEEE. pp. 30-37.

Notification for Patent Registration Formalities for Chinese Application No. 200580022148.4 dated Jan. 19, 2012, 4 pages.
Japanese Patent Application No. 2007-516658; Notice of Reasons for Rejection dated May 27, 2011, 3 pages.
Japanese Patent Application No. 2007-516658; Notice of Reasons for Rejection dated Jul. 12, 2012, 6 pages.
Pimpler, "Google Maps API—The New World of Web Mapping," Apr. 2006, Geospatial Training & Consulting, LLC, pp. 1-44.
U.S. Appl. No. 10/867,871, filed Jun. 14, 2004: Notice of Allowance dated Jul. 12, 2007, 4 pages.
U.S. Appl. No. 10/867,871, filed Jun. 14, 2004: Non-Final Office Action dated Mar. 23, 2007, 5 pages.
U.S. Appl. No. 11/058,846, filed Feb. 15, 2005: Non-Final Office Action dated Jun. 23, 2011, 24 pages.
U.S. Appl. No. 11/058,846, filed Feb. 15, 2005: Final Office Action dated Sep. 16, 2010, 25 pages.
U.S. Appl. No. 11/058,846, filed Feb. 15, 2005: Non-Final Office Action dated Mar. 19, 2010, 9 pages.
U.S. Appl. No. 11/058,846, filed Feb. 15, 2005: Restriction Requirement dated Jul. 8, 2009, 6 pages.
U.S. Appl. No. 11/058,846, filed Feb. 15, 2005, Non-Final Office Action dated Sep. 17, 2008, 17 pages.
U.S. Appl. No. 11/840,124, filed Aug. 16, 2007: Non-Final Office Action dated Aug. 27, 2009, 4 pages.
U.S. Appl. No. 11/840,124, filed Aug. 16, 2007: Non-Final Office Action dated Aug. 17, 2010, 9 pages.
U.S. Appl. No. 11/840,124, filed Aug. 16, 2007: Restriction Requirement dated Mar. 5, 2010, 6 pages.
U.S. Appl. No. 11/840,124, filed Aug. 16, 2007: Final Office Action dated Mar. 11, 2011, 18 pages.
U.S. Appl. No. 11/863,603, filed Sep. 28, 2007: Non-Final Office Action dated Jun. 17, 2008, 8 pages.
U.S. Appl. No. 11/863,603, filed Sep. 28, 2007: Notice of Allowance dated Dec. 16, 2008, 6 pages.
U.S. Appl. No. 11/923,561, filed Oct. 24, 2007: Advisory Action dated Jun. 8, 2011, 3 pages.
U.S. Appl. No. 11/923,561, filed Oct. 24, 2007: Non-Final Office Action dated Jan. 19, 2012, 16 pages.
U.S. Appl. No. 11/923,561, filed Oct. 24, 2007: Final Office Action dated Aug. 16, 2012, 13 pages.
U.S. Appl. No. 11/923,561, filed Oct. 24, 2007: Non-Final Office Action dated Sep. 15, 2010, 10 pages.
U.S. Appl. No. 11/923,561, filed Oct. 24, 2007: Final Office Action dated Mar. 30, 2011, 10 pages.
U.S. Appl. No. 11/923,580, filed Oct. 24, 2007: Non-Final Office Action dated Feb. 24, 2010, 7 pages.
U.S. Appl. No. 11/923,580, filed Oct. 24, 2007: Final Office Action dated Dec. 13, 2010, 9 pages.
U.S. Appl. No. 11/923,580, filed Oct. 24, 2007: Non-Final Office Action dated Jun. 7, 2011, 10 pages.
U.S. Appl. No. 11/923,580, filed Oct. 24, 2007: Non-Final Office Action dated May 24, 2012, 8 pages.
U.S. Appl. No. 12/432,714, filed Apr. 29, 2009: Non-Final Office Action dated Mar. 30, 2011, 15 pages.
U.S. Appl. No. 12/432,714, filed Apr. 29, 2009: Final Office Action dated Nov. 28, 2011, 15 pages.
U.S. Appl. No. 13/230,508, filed Sep. 12, 2011: Restriction Requirement dated Aug. 9, 2012, 6 pages.
U.S. Appl. No. 13/230,508, filed Sep. 12, 2011: Non-Final Office Action dated Jan. 29, 2013, 15 pages.
U.S. Appl. No. 13/085,418, filed Apr. 12, 2011: Non-final Office Action dated May 22, 2012, 19 pages.
U.S. Appl. No. 13/085,418, filed Apr. 12, 2011: Final Office Action dated Oct. 15, 2012, 19 pages.
U.S. Patent Reexamination No. 90/011,499 filed Feb. 18, 2011: ReExam Final Rejection dated Feb. 17, 2012, 10 pages.
U.S. Patent Reexamination No. 90/011,499 filed Feb. 18, 2011: ReExam Non-Final Action dated Jul. 29, 2011, 11 pages.
U.S. Patent Reexamination No. 90/011,499 filed Feb. 18, 2011: Notice of Intent to Issue a ReExam dated May 21 2011, 6 pages.
U.S. Patent Reexamination No. 90/011,499 filed Feb. 18, 2011: Determination—ReExam Ordered dated Apr. 29, 2011, 13 pages.

(56) References Cited

OTHER PUBLICATIONS

Yee, et al., "Passpet: Convenient Password Management and Phishing Protection," ACM 2006, SOUPS, 12 pages.

Information Disclosure Statement Transmittal Letter, filed herewith on Aug. 2, 2013, 2 pages.

Final Office Action issued in U.S. Appl. No. 13/230,508, dated Jul. 23, 2013.

Non-Final Office Action issued in U.S. Appl. No. 13/763,422, dated Aug. 16, 2013.

Notice of Allowance issued in U.S. Appl. No. 11/058,846, dated Nov. 8, 2013.

Notice of Allowance issued in U.S. Appl. No. 13/085,418, dated Oct. 23, 2013.

Flaim, Denise, "The E-Shopper/If Security Fails, Disaster Isn't Always in the Cards," Newsday (Long Island, N.Y.), Section C07; May 23, 2001.

Gordon, Marcy; "SEC Beefing Up Internet Surveillance—Automated System to Search for Telltale Words, Phrases that Could Indicate Fraud," Journal Star (Peoria, IL); Section A07; Mar. 29, 2000.

Keefe et al., "E-Mail Scam Cites Bogus 'Fraud Alert' from Best Buy," Palm Beach Post (West Palm Beach, FL); Section 6A; Jun. 21, 2003, (Abstract only).

Non-Final Office Action issued in U.S. Appl. No. 13/230,508, dated Dec. 19, 2013.

Office Action issued in Canadian Patent Application No. 2,667,279, dated Nov. 15, 2013.

* cited by examiner

CREATING AND VERIFYING GLOBALLY UNIQUE DEVICE-SPECIFIC IDENTIFIERS

RELATED APPLICATIONS

The present application claims priority to U.S. Provisional Application No. 60/862,965, entitled "Creating and Using Globally Unique Device-Specific Identifiers," filed on Oct. 25, 2006. The specification of the 60/862,965 provisional application is hereby incorporated by reference in its entirety for all purposes, except for all those sections, if any, that are inconsistent with this specification.

FIELD OF THE INVENTION

The present invention relates to the field of data processing. More specifically, the present invention relates to the creation and verification of globally unique device-specific identifiers.

BACKGROUND OF THE INVENTION

Advances in microprocessor technologies have made computing ubiquitous. Advances in networking and telecommunication technologies have also made computing increasingly networked. Today, huge volumes of content and services are available through interconnected public and/or private networks. Ironically, the ubiquitous availability of computing has also led to abuses, such as denial of service attacks, viruses, spam, and phishing. For various on-line applications, it is increasingly desirable to uniquely identify a computing device (hereinafter, simply device).

Prior art methods of identifying devices have included the usage of device serial numbers, media access control (MAC) addresses and so forth.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

Illustrative embodiments of the present invention include, but are not limited to, methods and apparatuses for receiving, by a server, a plurality of identifiers associated with a client device. The server may also encrypt a plurality of encoding values associated with the plurality of identifiers using a first key of a key pair of the server, and may generate a token uniquely identifying the client device, a body of the token including the encrypted plurality of encoding values. In other embodiments, the server may receive a token along with the plurality of identifiers. In such embodiments, the server may further verify the validity of the received token, including attempting to decrypt a body of the received token with a key associated with a second server, such as its public key, the second server having generated the received token, and, if decryption succeeds, comparing ones of the plurality of identifiers with second identifiers found in the decrypted body to check for inconsistencies.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
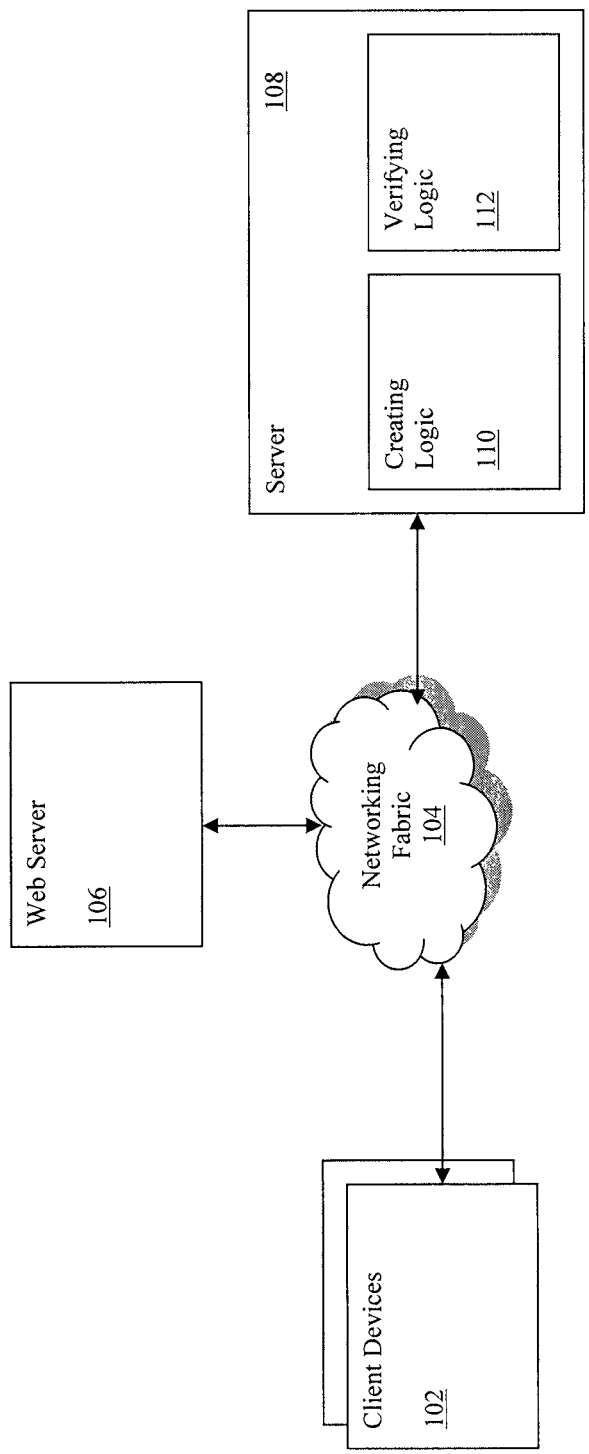
FIG. 1 illustrates an overview of various embodiments of the present invention.

FIG. 1 illustrates an overview of various embodiments of the present invention. As illustrated, one or more client devices 102 may receive tokens serving as globally unique device-specific identifiers of the client devices 102 from a server 108. Client devices 102 may be communicatively coupled to one or both of web server 106 and server 108 through networking fabric 104. In one embodiment, web server 106 and server 108 may actually be the same server device. In other embodiments, web server 106 may mediate communication between client devices 102 and server 108. Server 108 may in turn include token creating logic 110 and token verifying logic 112.

Server 108 may request of a client device 102 a plurality of non-unique identifiers and a token, if the client device already has a token. If the client device 102 does not have a token, it may provide only the identifiers, and server 108 may invoke creating logic 110. Creating logic 110 may receive the identifiers and encrypt a plurality of encoding values associated with the identifiers with a private key of server 108. Creating logic 110 may then generate a token having the encrypted values as the token body, and may transmit the token to the client device 102.

If, on the other hand, the client device 102 does have a token, it may provide both the token and the identifiers, and server 108 may invoke verifying logic 112. Verifying logic 112 may receive the token and identifiers and may verify the validity of the token. In some embodiments, verifying logic 112 may first attempt to decrypt the body of the token using the public key of the server that generated the token. If decryption succeeded, verifying logic 112 may then compare the received identifiers to identifiers comprising the body of the decrypted token to check for inconsistencies. In one embodiment, verifying logic 112 may reissue the token, if verification fails, based on one or more factors. In other embodiments, verifying logic 112 may periodically reissue the token regardless of the success or failure of verification.

Figure 4:
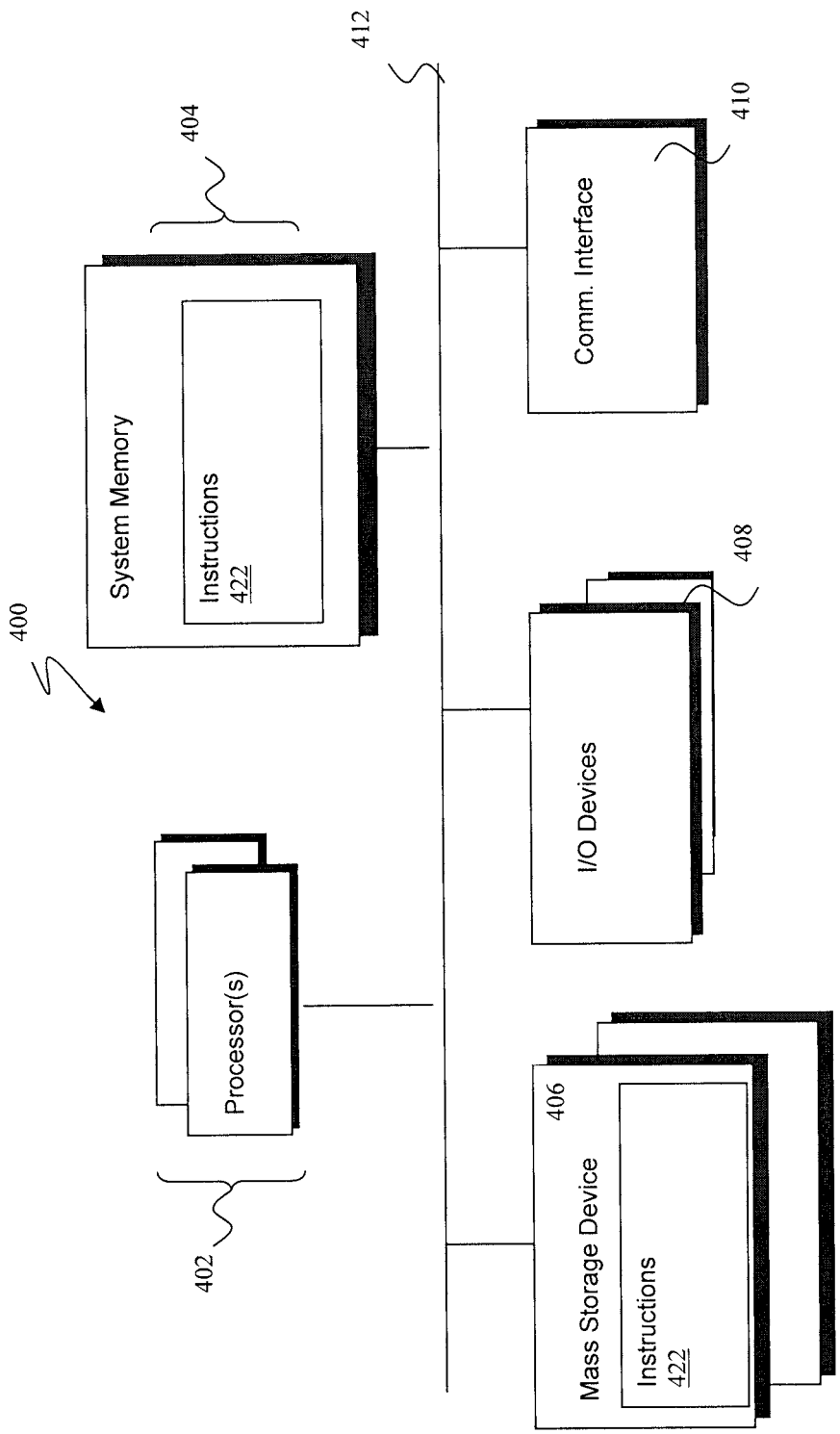
FIG. 4 is a block diagram illustrating an example computer system suitable for use to practice the present invention, in accordance with various embodiments.

As illustrated, client device 102, web server 106, and/or server 108 may each be one or more of any sort of computing device known in the art, except for creating logic 110, verifying logic 112, and other logic adapted to perform the operations described above and below. Client device 102, web server 106, and/or server 108 may each be a personal computer (PC), a workstation, a server, a router, a mainframe, a modular computer within a blade server or high-density server, a personal digital assistant (PDA), an entertainment center, a set-top box or a mobile device. Further, client device 102, web server 106, and/or server 108 may each be any single- or multi-processor or processor core central processing unit (CPU) computing system known in the art, except for creating logic 110, verifying logic 112, and other logic adapted to perform the operations described above and below. An exemplary single-/multi-processor or processor core client device 102, web server 106, or server 108 is illustrated by FIG. 4, and will be described in greater detail herein.

In various embodiments, as previously mentioned, client devices 102 may be any end-user or other computing devices in communication with one or both of web server 106 and/or server 108. In one exemplary embodiment, a client device 102 may be a client in an ecommerce transaction, and web server 106 may require that the client device 102 provide a globally unique identifier as prior to completion of the transaction and/or as part of a log-in/authentication process.

Client devices 102 may possess client logic having been provided to client devices 102 to enable client devices 102 to recognize and use tokens serving as the client devices' 102 globally unique identifiers. In one embodiment, a client device 102 may retrieve such client logic from web server 106, the web server 106 having received the client logic from server 108. In other embodiments, server 108 and web server 106 may be the same device, and client devices 102 may receive the client logic directly from server 108. The client logic may enable client devices 102 to perform a series of functions, including responding to requests from server 108 for tokens and non-unique identifiers. The logic may be able to determine whether or not a client device possesses a token, and if so, may be able to provide the token in response to the request. The logic may also enable a client device 102 to determine a plurality of non-unique identifiers and to provide those to the requesting server 108, with or without the token. Such non-unique identifiers may include at least one of a device serial number, a MAC address, an operating system (OS) type, and OS version, a time code, a country code, or a region code. In some embodiments, the client logic may also enable a client device 102 to receive a token from server 108 and to store that token to facilitate the client device 102 in responding to future requests from the token and identifiers.

As illustrated, client device 102, web server 106, and/or server 108 may each be communicatively connected to one or all of each other. In some embodiments, client device 102, web server 106, and/or server 108 may be connected by a networking fabric 104. Networking fabric 104 may include one or more of a LAN, a WAN, and the Internet. Networking fabric 104 may also be partially wired or wireless. In one embodiment, networking fabric 104 may be a private network connecting client devices 102 and server 108, server 108 also serving as web server 106, combining the services of those devices into one device. Communications across networking fabric 104 may be facilitated by any communication protocol known in the art, such as the Hypertext Transfer Protocol (HTTP) or the file transfer protocol (FTP), and any transport protocol known in the art, such as the Transmission Control Protocol/Internet Protocol (TCP/IP) suite of protocols. In some embodiments, client device 102, web server 106, and/or server 108 may be connected by one or more routers of the networking fabric (not illustrated).

In various embodiments, as previously described, web server 106 may serve as an intermediary between client devices 102 and server 108. In such embodiments, some or all of the communications between client devices 102 and server 108, described more fully herein, may actually be routed through web server 106. As previously mentioned, in one exemplary embodiment, web server 106 may be a web server in an ecommerce transaction and may require end-user client devices 102 to provide a token serving as a globally-unique identifier. In such an embodiment, web server 106 may communicate with server 108 to request creation and/or verification of tokens for client devices 102. Web server 106 may also receive client logic from server 108 and may provide the client logic to new client devices 102 to enable the new client devices 102 to receive and provide tokens. In one embodiment, web server 106 may request a token from a client device 102 as part of a log-in/authentication process. In other embodiments, web server 106 may request the token at some different stage in the ecommerce transaction or as part of some other sort of transaction.

In alternate embodiments, web server 106 and server 108 may actually be the same computing device or may be two different devices of a common computing environment. In such an embodiment, the combined web server 106/server 108 may perform some or all of the operations of both devices. Such alternate embodiments may be utilized, for example, within the context of a private network where communication between a web server 106 of the private network and a server 108 not belonging to the private network might be considered undesirable.

As illustrated, and as previously mentioned, server 108 may be communicatively coupled to one or both of client devices 102 and server 106 through networking fabric 104. And as further described, server 108 may possess token creating logic 110 and token verifying logic 112 to enable server 108 to create and verify tokens that serve as globally-unique device identifiers. In various embodiments, server 108 may provide the above-mentioned client logic to web server 106 for dispersal to client devices 102, or may provide the client logic to client devices 102 directly via networking fabric 104. The client logic may have been generated by server 108, or may have been generated by another device and provided to server 108. In some embodiments, server 108 may receive a request from web server 106, the request asking server 108 to verify or create a token for a client device 102. In response, server 108 may request the client device 102 to provide its token if it has one, as well as a plurality of non-unique identifiers associated with the client device 102. In other embodiments, server 108 may request the token and identifiers automatically, on some pre-determined basis, without first receiving a request from the web server 106. In one embodiment, server 108 may specify which non-unique identifiers the client device 102 should provide. In other embodiments, server 108 allows the client device 102 to determine which non-unique identifiers to provide. Upon receiving the client device 102's response, server 108 may determine whether the client device 102 included a token in the response. If the client device 102 did not provide a token, server 108 may invoke token creating logic 110. If client device 102 did provide a token, server 108 may invoke token verifying logic 112.

In various embodiments, creating logic 110 may receive the non-unique identifiers of the client device 102. In one embodiment, the identifiers may be received as parameters to the invocation of creating logic 110. Upon receiving the identifiers, creating logic 110 may generate a plurality of encoding values associated with the identifiers. Creating logic 110, in some embodiments, may generate the encoding values by performing a hash function on the identifiers (such as, for example, an MD5 hash of the identifiers). Creating logic may then assemble all or a portion of each encoding value (such as, for example, the low-order byte of an MD5 hash of an identifier having a length of one byte) into a token body. In various embodiments, creating logic may then encrypt the token body with a first key of a key pair, such as, for example, a private key of a public-private key pair, of server 108. The resulting encrypted token body may be, for example, a base64 string.

In some embodiments, creating logic 112 may then generate a token including the encrypted body, the token uniquely identifying the client device 102. Creating token may also include within the token a field to hold a server identifier. The server identifier may be useful if there are multiple servers 108 to identify which of the servers 108 generated the token. Thus, as described in greater detail below, verifying logic 112 of a different server 108 may identify which key to decrypt a token body with. Each token may also include a message format version field and fields for separating characters, in some embodiments. The entire generated token may, in one embodiment, comprise an ANSI string.

In some embodiments, upon generating the token, creating logic 112 may transmit the token to the client device 102, either through web server 106 or directly.

In various embodiments, verifying logic 112 may receive the token and non-unique identifiers of the client device 102. In one embodiment, the token and identifiers may be received as parameters to the invocation of verifying logic 112. Upon receiving the token and identifiers, verifying logic 112 may verify the validity of the token, the verifying including decrypting the token's body and, if decryption succeeds, comparing the received identifiers to identifiers found in the decrypted body to check for inconsistencies. In some embodiments, verifying logic 112 may first attempt to decrypt the body of the token. Verifying logic 112 may read the server identifier of the token to determine which server 108 generated the token, and may decrypt the token body with the public key of that server 108. In some embodiments, each server 108 stores the public keys of every other server 108 in connection with every other server 108's server identifier. In other embodiments, verifying logic 112 may request the generating server 108's public key from that server 108 or from a common storage.

If decryption succeeded, verifying logic 112 may then compare the received identifiers to identifiers found in the decrypted body to check for inconsistencies. As previously mentioned, a token body may comprise a plurality of encoding values associated with a plurality of non-unique identifiers. These non-unique identifiers of the token ought to be, in some embodiments, identical to the received plurality of non-unique identifiers, as both are non-unique identifiers of the same device. In some embodiments, such as when a client device 102 has a new OS installed or a new hard drive, some of the non-unique identifiers for that client device 102 may change. Thus, in such a case, the non-unique identifiers whose encoding values form the token body may differ from the non-unique identifiers provided. Also, if one device steals another device's token, there may likely be a number of inconsistencies between the identifiers. In one embodiment, verifying logic 112 may first decode the encoding values to retrieve the identifiers, and may then perform a comparison of the decoded identifiers with the received identifiers to determine if there are any differences.

In addition to decrypting and comparing, verifying logic 112 may also check other fields of the token, such as a "reissue" flag field indicating that the token is a reissued token, a counter of the number of times the server 108 has seen that token, as well as a list of tokens and identifiers associated with evidence of fraud. Based on some of all of the above operations, verification logic 112 may ascertain the token's validity. The criteria used in making such judgments may vary from embodiment to embodiment. For example, in one embodiment, verifying logic 112 may consider a token to be valid as long as its body decrypts. In another embodiment, verifying logic 112 may require that decryption succeed, that identifiers be identical, and that none of the token and identifiers are present on the list of tokens and identifiers associated with evidence of fraud.

If verifying logic found the token to be valid, verifying logic 112 may inform the web server 106 and/or client devices 102 that the token is valid. If, on the other hand, verifying logic 112 found the token to be invalid, verifying logic may determine whether to reissue the token, the determining being based on one or more factors. In some embodiments, such factors may include success or failure of decryption, inconsistencies between some of the identifiers, presence of a token and/or device identifier of the client device 102 on the list of tokens and identifiers associated with evidence of fraud, a count of a number of times the token has been received by the server 108, some other association of the client device 102 to evidence of fraud, or a level of risk associated with the client device 102 (for example, a token with its reissue flag set may be deemed to be associated with a higher level of risk, in some embodiments). The number and weight of the factors may vary from embodiment to embodiment. Generally, if verifying logic 112 determines that fraud is less likely, based on the aforementioned factors, verifying logic may invoke creating logic 110 to reissue the token, passing creating logic 110 the received non-unique identifiers, as well as indicating to creating logic 110 that a reissue flag should be present in the token body and should be set. If, on the other hand, verifying logic 112 determines that a token should not be reissued, verifying logic may simply inform the web server 106 and/or client device 102 that the token was invalid.

In various embodiments, regardless of whether the token is valid, the server 108 may periodically reissue the token.

Figure 2:
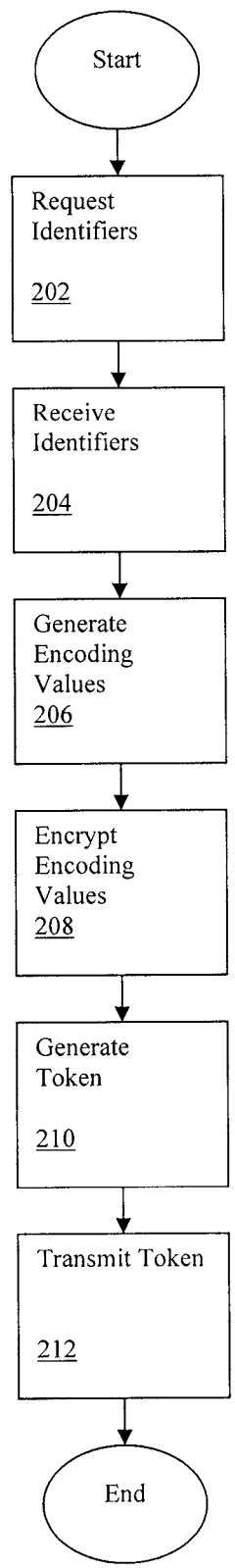
FIG. 2 illustrates a flowchart view of selected token creating operations, in accordance with various embodiments.

FIG. 2 illustrates a flowchart view of selected token creating operations, in accordance with various embodiments. As illustrated, a server may request of a client device a plurality of identifiers associated with the client device, block 202. In various embodiments, the plurality of identifiers may include at least one of a device serial number, a MAC address, an operating system (OS) type, and OS version, a time code, a country code, or a region code. The server may then receive the plurality of identifiers, block 204. In one embodiment, the identifiers may be received from a web server of a subscriber to services of the server.

In various embodiments, the server may then generate a plurality of encoding values associated with the plurality of identifiers by performing a hash function on the plurality of identifiers, block 206. Next, the server may encrypt the plurality of encoding values using a first key of a key pair of the server, block 208. In one embodiment, the first key of the key pair may be a private key of the server. In some embodiments, the server may then generate a token uniquely identifying the client device, a body of the token including the encrypted plurality of encoding values, block 210. In one embodiment, the token may further include a server identifier to identify the server as a generator of the token.

In some embodiments, the server may then transmit the token to the client device, block 212. In one embodiment, rather then transmitting directly to the client device, the server may transmit the token to a web server to facilitate the web server in providing the token to the client device. In another embodiment, the server may also provide client logic to the client device, directly or indirectly, to enable the client device to recognize and use the token.

Figure 3:
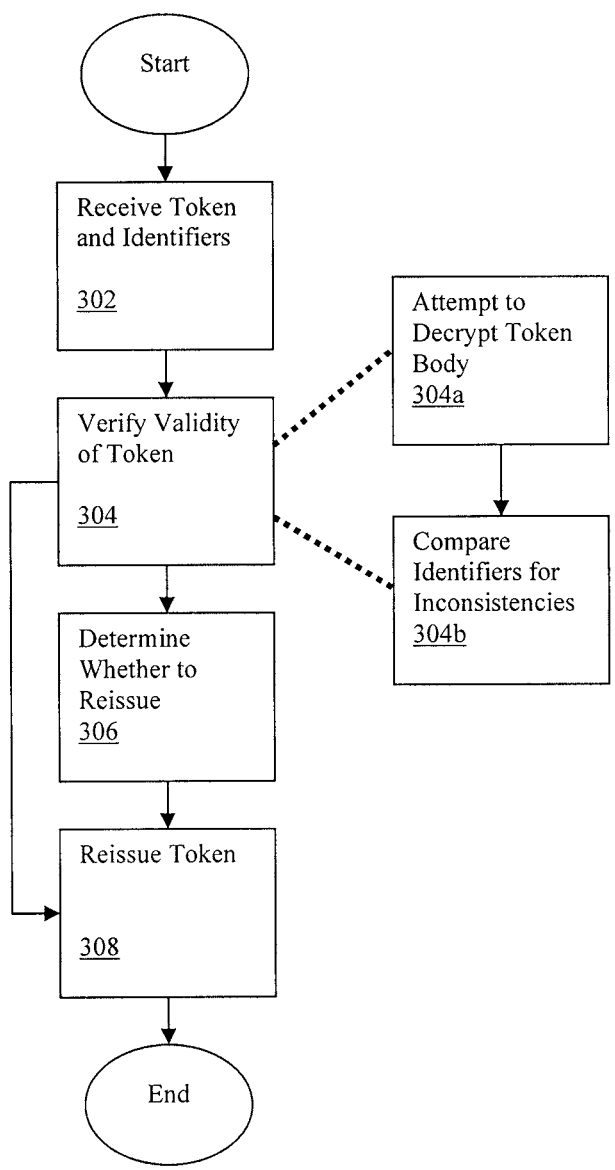
FIG. 3 illustrates a flowchart view of selected token verifying operations, in accordance with various embodiments.

FIG. 3 illustrates a flowchart view of selected token verifying operations, in accordance with various embodiments. As illustrated, a first server may receive a token associated with a client device, the token acting as a unique identifier of the client device, and a plurality of first identifiers associated with the client device, block 302. In one embodiment, the token and first identifiers may be received from a web server of a subscriber to services of the first server.

In various embodiments, the first server may then verify the validity of the received token, block 304. In some embodiments, the verifying may include attempting to decrypt a body of the token with a key associated with a second server, block 304*a*, the second server having generated the token. In one embodiment, the key associated with the second server may be the public key of the second server. Also, the verifying may include, if decryption succeeds, comparing ones of the plurality of first identifiers with second identifiers found in the decrypted body to check for inconsistencies, block 304*b*. In some embodiments, the second identifiers are identical to the first identifiers. Further, the first or second plurality of identifiers may include at least one of a device serial number, a media access control (MAC) address, an operating system (OS) type, and OS version, a time code, a country code, or a region code.

Next, the first server may, if token verification fails, determine whether to reissue the token based on one or more factors, block 306. In one embodiment, the one or more factors may include at least one of success or failure of decryption, inconsistencies between ones of the first and second identifiers, presence of a device identifier of the client device on a list of suspect devices, a count of a number of times the token has been received, association of the client device to evidence of fraud, or a level of risk associated with the client device. If the determination indicates that the token should be reissued, the first server may reissue the token, block 308.

In various embodiments, the first server may periodically reissue the token, block 308, regardless of whether the verifying indicates that the token is valid.

FIG. 4 is a block diagram illustrating an example computer system suitable for use to practice the present invention, in accordance with various embodiments. As shown, computing system 400 includes one or more processors or processor cores 402, and system memory 404. For the purpose of this application, including the claims, the terms "processor" and "processor cores" may be considered synonymous, unless the context clearly requires otherwise. Additionally, computing system 400 includes mass storage devices 406 (such as diskette, hard drive, compact disc read only memory (CDROM) and so forth), input/output devices 408 (such as keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not illustrated).

Each of these elements performs its conventional functions known in the art. In particular, system memory 404 and mass storage 406 may be employed to store a working copy and a permanent copy of the programming instructions implementing all or a portion of earlier described server functions, herein collectively denoted as 422. The instructions 422 may be assembler instructions supported by processor(s) 402 or instructions that can be compiled from high level languages, such as C.

The permanent copy of the programming instructions may be placed into permanent storage 406 in the factory, or in the field, through, for example, a distribution medium (not shown), such as a compact disc (CD), or through communication interface 410 (from a distribution server (not shown)). That is, one or more distribution media having instructions 422 may be employed to distribute the instructions 422 and program various computing devices.

The constitution of these elements 402-412 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. Those skilled in the art will readily appreciate that the present invention may be implemented in a very wide variety of embodiments or extended therefrom. This application is intended to cover any adaptations or variations of the embodiments discussed herein. Therefore, it is manifestly intended that this invention be limited only by the claims and the equivalents thereof.

What is claimed is:

1. A method performed by a computing system comprising a key pair, the method comprising:
   receiving a plurality of first identifiers associated with a client device;
   generating a plurality of encoding values based on the plurality of first identifiers;
   encrypting the plurality of encoding values using a first key of the key pair;
   generating a token uniquely identifying the client device, the token comprising the encrypted plurality of encoding values;
   after the token has been generated, receiving a plurality of second identifiers associated with the client device, and the token uniquely identifying the client device;
   attempting to decrypt the encrypted plurality of encoding values of the token with a second key of the key pair to obtain a decrypted plurality of encoding values;
   when the attempt to decrypt the encrypted plurality of encoding values of the token is successful, decoding the decrypted plurality of encoding values to obtain a decloded plurality of first identifiers, and comparing ones of the decloded plurality of first identifiers with corresponding ones of the plurality of second identifiers to identify any inconsistencies therebetween; and
   determining token verification has failed when the attempt to decrypt the encrypted plurality of encoding values is unsuccessful, or inconsistencies between the ones of the decloded plurality of first identifiers and corresponding ones of the second plurality of identifiers are identified.

2. The method of claim 1, wherein before the token has been generated, the plurality of first identifiers are received from a web server of a subscriber to services provided by the computing system, and
   the method further comprises transmitting the token to the web server before the plurality of second identifiers associated with the client device, and the token uniquely identifying the client device are received, the web server providing the token to the client device.

3. The method of claim 1, further comprising before the plurality of second identifiers associated with the client device, and the token uniquely identifying the client device are received, transmitting the token to the client device.

4. The method of claim 1, wherein the plurality of first identifiers, and the plurality of second identifiers include at least one of a device serial number, a media access control ("MAC") address, an operating system ("OS") type, an OS version, a time code, a country code, or a region code.

5. The method of claim 1, wherein generating the plurality of encoding values based on the plurality of first identifiers comprises performing a hash function on the plurality of first identifiers.

6. The method of claim 1 for use with the computing system comprising a server associated with a server identifier, wherein the token is generated by the server, and the token further includes the server identifier identifying the server as a generator of the token.

7. The method of claim 1, further comprising requesting the plurality of first identifiers from the client device.

8. The method of claim 1, wherein the first key of the key pair is a private key.

9. The method of claim 8, wherein the second key of the key pair is a public key.

10. A method performed by a computing system comprising a first server and a second server, the second server being associated with a key, the method comprising:
    receiving, at the second server, a plurality of second identifiers associated with a client device;
    generating, by the second server, a token comprising an encrypted body comprising the plurality of second identifiers, the plurality of second identifiers being encrypted in the encrypted body, the token acting as a unique identifier of the client device;
    receiving, at the fist server, a plurality of first identifiers associated with the client device, and the token associated with the client device;
    attempting, by the first server, to decrypt the encrypted body of the token with the key associated with the second server to thereby decrypt the plurality of second identifiers;
    when the attempt to decrypt the encrypted body of the token is successful, comparing, by the first server, ones of the plurality of first identifiers with corresponding ones of the plurality of second identifiers to identify any inconsistencies therebetween; and
    determining, by the first server, token verification has failed when the attempt to decrypt the encrypted body of the token is unsuccessful, or inconsistencies between the ones of the plurality of first identifiers and the corresponding ones of the second plurality of identifiers are identified.

11. The method of claim 10, wherein the token and plurality of first identifiers are received at the first server from a web server of a subscriber to services provided by the first server.

12. The method of claim 10, wherein the plurality of first identifiers or the plurality of second identifiers include at least one of a device serial number, a media access control ("MAC") address, an operating system ("OS") type, an OS version, a time code, a country code, or a region code.

13. The method of claim 10, wherein the key associated with the second server is a public key of the second server.

14. The method of claim 10, wherein the plurality of second identifiers are identical to the plurality of first identifiers.

15. The method of claim 10, further comprising, when it is determined that the token verification has failed, determining, by the first server, a likelihood of fraud based on one or more predetermined factors, and reissuing the token if the likelihood of fraud is acceptable.

16. The method of claim 15, wherein the one or more predetermined factors include at least one of inconsistencies between the ones of the plurality of first identifiers and the corresponding ones of the second plurality of identifiers, presence of a device identifier of the client device on a list of suspect devices, a count of a number of times the token has been received by the first server, association of the client device with evidence of fraud, or a level of risk associated with the client device.

17. The method of claim 9, further comprising periodically reissuing the token regardless of whether it is determined that the token verification has failed.

18. A method performed by a computing system associated with a key, the method comprising:
    receiving a plurality of second identifiers associated with a client device;
    generating a token comprising an encrypted body comprising the plurality of second identifiers, the plurality of second identifiers being encrypted in the encrypted body, the token acting as a unique identifier of the client device;
    receiving a plurality of first identifiers associated with the client device, and the token associated with the client device;
    attempting to decrypt the encrypted body of the token with the key to thereby decrypt the plurality of second identifiers;
    when the attempt to decrypt the encrypted body of the token is successful, comparing ones of the plurality of first identifiers with corresponding ones of the plurality of second identifiers to identify any inconsistencies therebetween; and
    determining token verification has failed when the attempt to decrypt the encrypted body of the token is unsuccessful, or inconsistencies between the ones of the plurality of first identifiers and the corresponding ones of the second plurality of identifiers are identified.

19. The method of claim 18, further comprising:
    when it is determined that the token verification has failed, determining a likelihood of fraud based on one or more rules or policies, and reissuing the token when the likelihood of fraud is acceptable.

20. The method of claim 19, wherein the one or more rules or policies include at least one of inconsistencies between the ones of the plurality of first identifiers and the corresponding ones of the second plurality of identifiers, presence of a device identifier of the client device on a list of suspect devices, a count of a number of times the token has been received, association of the client device with evidence of fraud, or a level of risk associated with the client device.

21. The method of claim 18, wherein the plurality of first identifiers, and the plurality of second identifiers include at least one of a device serial number, a media access control ("MAC") address, an operating system ("OS") type, an OS version, a time code, a country code, or a region code.

* * * * *